(12) United States Patent
Chin

(10) Patent No.: US 6,757,297 B1
(45) Date of Patent: Jun. 29, 2004

(54) METHOD AND APPARATUS FOR DYNAMIC CONFIGURATION AND CHECKING OF NETWORK CONNECTIONS VIA OUT-OF-BAND MONITORING

(75) Inventor: Hon Wah Chin, Palo Alto, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/321,979

(22) Filed: May 28, 1999

Related U.S. Application Data

(63) Continuation-in-part of application No. 09/225,920, filed on Jan. 5, 1999.

(51) Int. Cl.[7] ............................... H04J 1/16; H04J 3/14
(52) U.S. Cl. ........................ 370/469; 370/221; 370/225
(58) Field of Search ................................. 370/216, 217, 370/218, 221, 222, 225, 226, 255, 256, 469; 709/249, 221, 225, 250

(56) References Cited

U.S. PATENT DOCUMENTS 5,490,252 A * 2/1996 Macera et al. .............. 370/402
5,495,471 A * 2/1996 Chow et al. ................. 370/221
5,781,535 A * 7/1998 Russ et al. ................. 340/2.23
5,793,746 A * 8/1998 Gerstel et al. .............. 370/228

OTHER PUBLICATIONS

Flanagan, T., Fiber Network Survivability Jun. 1990, IEEE Communications Magazine, pp. 46–53.*

* cited by examiner

*Primary Examiner*—Wellington Chin
*Assistant Examiner*—William Schultz
(74) *Attorney, Agent, or Firm*—Michael R. Cammarata; Stephen J. LeBlanc

(57) ABSTRACT

A first network element includes or is associated with a query engine that allows it to retrieve operating parameters from a second network element even when the first and second network elements are not participating in a common routing protocol. The first element is thereby able to determine if the second network is operational and to take action to reroute data to a backup element if the second element is not operational.

19 Claims, 4 Drawing Sheets

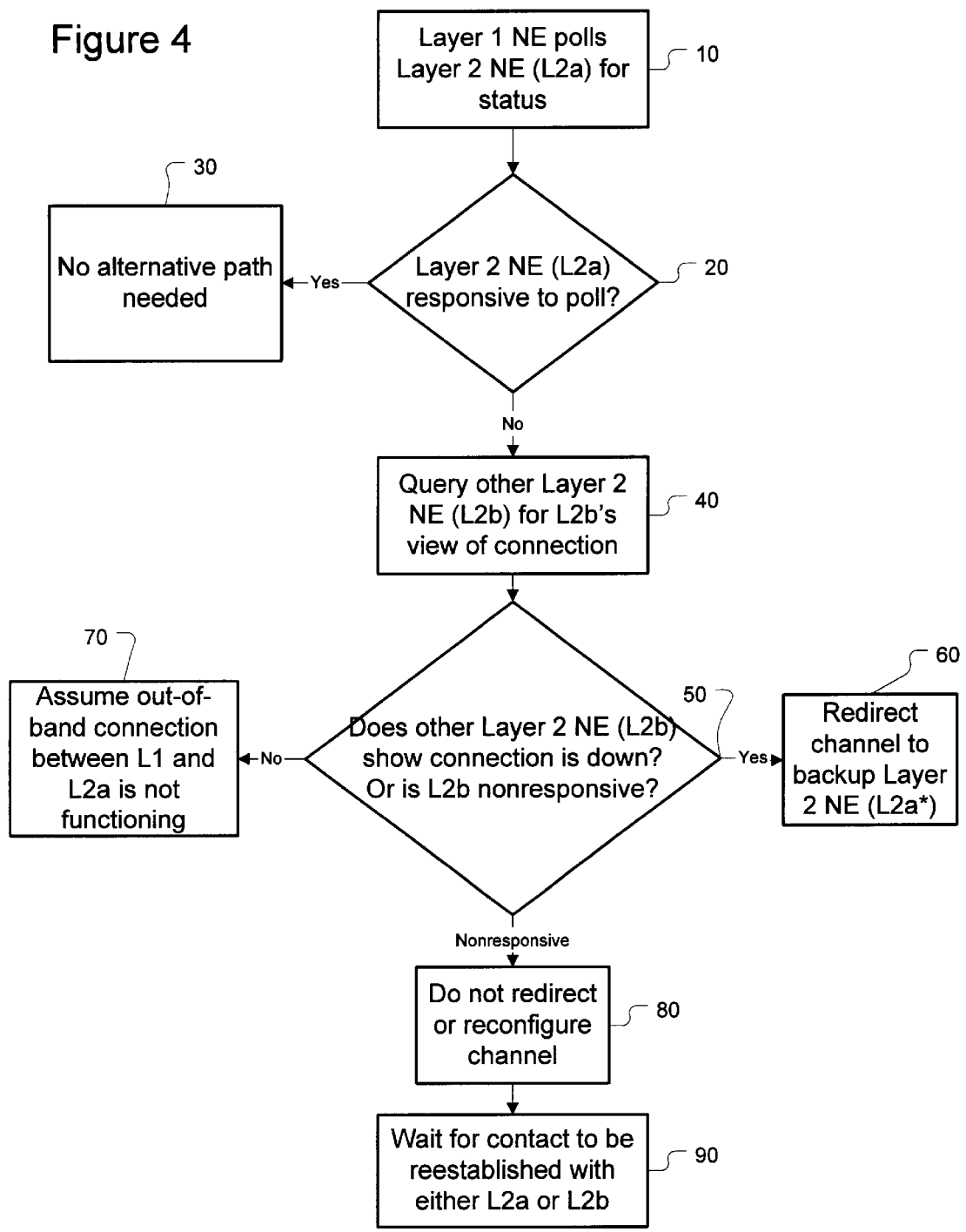

METHOD AND APPARATUS FOR DYNAMIC CONFIGURATION AND CHECKING OF NETWORK CONNECTIONS VIA OUT-OF-BAND MONITORING

CROSS REFERENCE TO RELATED APPLICATIONS

This application is a continuation in part of patent application Ser. No. 09/225,920, filed Jan. 5, 1999, which is incorporated herein by reference.

BACKGROUND OF THE INVENTION

The present invention relates to the field of data and signal communications and communication systems. More particularly, the invention relates to network elements used to facilitate network communication.

A high level of detailed knowledge regarding network devices and protocols is presumed of practitioners in the art. This application presumes familiarity with commonly used network terminology and protocols. For additional background information, the reader is referred to the well-known RFC (Request for Comments) publications of the Internet Engineering Task Force (IETF), as well as the networking standards published by standards bodies such as the IEEE and the International Standards Organization (ISO). This application presumes familiarity with various well-known communications protocols such as ATM (Asynchronous Transfer Mode) and SONET (Synchronous Optical Network). For more information about SONET, the reader is referred to coassigned patent application Ser. No. 09/020,954, now U.S. Pat. No. 6,046,833, filed Feb. 9, 1998, entitled METHOD AND APPARATUS FOR OPERATION, PROTECTION, AND RESTORATION OF HETEROGENEOUS OPTICAL COMMUNICATION NETWORKS, which is incorporated herein by reference for all purposes.

Layered Network Protocols

Modem networks operate according to a layered network protocol suite. One published model for a typical protocol suite is known as the International Standards Organization (ISO) Open Systems Interconnection (OSI) reference model. In the OSI model, networking functions are divided into roughly seven layers, which from the lowest layer to the highest layer may be referred to as: (1) the physical layer, (2) the data link layer, (3) the network layer, (4) the transport layer, (5) the session layer, (6) the presentation layer, and (7) the application layer. In some situations, Layer 1 (the physical layer) includes a number of sublayers. These sublayers may include a second, mostly independent, generally high-speed, network with an independent layered protocol suite. Sublayer communication can include, for example, public data networks provided by telephone companies or by internetwork service providers. One typical example of a sublayer is a high-speed optical network, such as SONET, that can be used to provide distant physical layer links to a subscriber network. Another technology used for sublayer communications is ATM. A sublayer network that provides physical layer connections to network elements in another network is sometimes referred to as a subnetwork.

A set of standard interfaces is implicit between different network protocols operating at different layers. Typically, a particular network element handles traffic primarily at one layer or a subset of layers. For example, layer 3 traffic, consisting of Internet Protocol (IP) packets and other layer 3 packets, is generally handled by NEs referred to as routers, while layer 2 packets (or frames) are generally handled by NEs referred to as bridges. However, in some implementations, the functions of these separate NEs have been blended, such that some NEs may function partially as routers and partially as bridges.

An important concept in a layered network protocol suite is the ideal of layer independence. Layer independence implies that protocols and devices at one layer may operate with a variety of different protocols and devices operating at higher or lower layers without detailed knowledge about operation of those other layers. Generally, each layer is responsible for monitoring traffic and performance at its own layer (when performance is monitored at all) and there is little or no direct communication between layers of performance or configuration information.

Determining Channel Operation without Examining Channel Data

In some situations it may be disadvantageous for a network element (NE), or group of NEs, to directly monitor its own performance. One such situation arises in optical networks, where it is desirable to route some or all of an optical signal through an NE without examining that signal, as described as a particular embodiment in application Ser. No. 09/020,954, now U.S. Pat. No. 6,046,833. Other such situations might arise in present or future designs of ATM-type or sublayers or other sublayer technology, where faster or cheaper service can be provided at a sublayer if other NEs can be used by the sublayer to detect transmission problems.

In optical networks, it is known for optical NEs using wave division multiplexing (WDM) to indirectly monitor the performance of a data channel by monitoring the performance of a different wavelength (like the optical supervisory channel) on the same optical cable and from that to infer performance of the data channel. This is an imperfect method for ensuring the accuracy of the data channel itself, however. Another known optical method is for a transmitting optical NE to impress a low frequency signal onto an data signal. The receiving NE can then monitor the low frequency signal to infer the data optical signal quality. This, however, does require some sampling of the data wavelength and also requires additional transmission and detection circuitry for the optical NEs.

It has been proposed to develop new protocols for an NE such as an optical NE to communicate with NEs in other layers to determine the performance of the optical traffic. However, developing such protocols is time consuming and difficult given the large variety of higher layer NEs that may communicate data with the optical layer and a practical means for doing so has not yet been developed.

Another alternative solution is intervention from a human operator with access, either via multiple management stations or an integrated management system, to the status of the different network layers. The operator would then use information from a management station(s) to inform the optical or ATM sublayer NE that there is a problem on a particular connection. However, in many situations, this solution is slow and expensive.

What is needed is a method and apparatus allowing network devices in one group or operating at one layer to configure themselves or be configured in response to traffic conditions determined from a different layer and without intervention from a separate management station.

What is further needed is such a method that does not require the development of new protocols for exchanging configuration information between layers. What is further needed is a method and apparatus in an optical network allowing optical NEs to detect and respond to optical channel difficulties without having to directly sample or monitor channel data signals.

What is further needed is a method and system allowing a network layer capable of reconfiguring itself to provide services or connections to a different layer to infer connection performance and make configuration decisions without incurring the burden of analyzing a data payload channel for control information.

SUMMARY OF THE INVENTION

The present invention in one general aspect provides a method and system for dynamically re-configuring portions of a network and for checking network connections using out-of-band monitoring. In various embodiments, the invention includes a mechanism for a network element (NE) in a first group of NEs to coordinate its configuration and behavior with an NE in a second group, where the first NE is not participating in the coordination protocols of the second group. In an embodiment with important advantages, the invention uses existing standard network management protocols and an installed base of management agents in the second group to effect this coordination. In another important aspect, the invention provides a mechanism for an NE or a group of NEs to determine the performance of a communication channel passing through that NE without examining a data signal in that communication channel.

In one embodiment, the invention utilizes an agent associated with an NE and capable of communicating operating parameters. There is a large installed base of such agents, typically in layer 3 (L3) network devices (such as routers). These agents are generally intended for communication with network management stations that report network operations to a human user. In prior art systems, existing installed agents are intended to facilitate configuration of the NE in which they are installed or with which they are associated, generally through intervention of a human network manager. According to an embodiment of the invention, a first NE, possibly one operating at a different network layer or a different network or subnetwork, uses the agents to learn about the success or failure of data handled by a second NE and to thereby infer the performance of the first NE. The first NE may then take configuration actions on itself or may use the agent in the second NE to affect the configuration of the second NE. This action may include such things as rerouting data from failed or overloaded communication channels, changing priorities, changing path costs, or establishing backup paths for heavily used communications channels.

One area of particular interest for the invention is in sublayer communications using optical NEs. In such networks, it is desirable for the optical NEs to be able to detect channel defects without examining the optical signal in the channel, and the present invention provides a mechanism for these NEs to detect trouble or failure in optical channels indirectly from other NEs.

A related area of particular interest for the invention is in communications where an intelligent NE attempts to provide traffic redirection or other reconfiguration based on the operation of communications in a different group of NEs. In some prior art networks, an intelligent NE accesses the data payload channel (or payload signal) to determine control information. IP routers and SONET ADMs, for example, receive and transmit payload traffic and analyze received payload signals in order to identify control information. This control information, sent and received on the same channel as the payload, allows the Routers/ADMs to infer the health of the attached network and make appropriate decisions. In prior art systems, a lower network layer can also determine the identity of the source of the signal or the NE at the other end of the direct connection layer by examining and analyzing the payload signal or channel. The SONET protocol, for instances, includes embedded overhead bytes in the data stream that are intended to be detected and acted upon by SONET-layer devices.

With the advent of higher speed network transmissions (such as optical transmissions) and optical layers with intelligence, the burden of analyzing a payload channel for control information, relative to the forwarding of the payload itself, has increased. The burden of analysis is further increased in optical devices that can carry a multiplicity of optical payload data formats.

Previously, a method and system using a standard network management protocol to exchange information between network layers to coordinate activities of a particular network layer was described. The present invention extends that approach to provide additional functions of detecting node failure and rerouting signals without examining a payload channel. In one embodiment, the present invention avoids building into lower layer or other layer NEs an ability to interpret or analyze a payload data signal, because control information intended for analysis by the other layer devices is not embedded in the same channel with payload data.

One function an intelligent network layer according to the invention can provide is to redirect communications away from a failed network node device to a backup device for that node. The intelligent network layer is initially informed of the desired connectivity and the planned backup connectivity and provides the connection between the primary nodes. As discussed in the above referenced application, and herein, an intelligent layer according to the invention makes queries to other-layer network devices in order to detect a failure of the primary device and provide the backup connectivity. The present invention has the advantage over prior art approaches in that it neither requires changes to the operation of other-layer network equipment, such as the ability to parse new protocols, nor does it require analyzing and parsing the payload signal.

The invention will be explained with respect to specific embodiments, but it will be clear to those of skill in the art that the invention may be deployed in many alternative network configurations. The invention may also be deployed for configuration of network devices between different layers than the layers specifically described herein. For the sake of clarity, the invention will be described in terms of specific exemplary networks. It is inherent in the art that networks can be highly variable in the arrangement and configuration of different components. These examples should therefore been taken as illustrations; and not seen as limiting the invention. It is also inherent in the art that network systems are illustrated at a particular layer of abstraction, with many devices and details omitted.

BRIEF DESCRIPTION OF THE DRAWINGS

FIG. 4 is a high-level flowchart illustrating the functions performed by an L1 NE utilizing layer 2 NEs to determine layer 2 NE status and connectivity and redirect or reconfigure a channel in response thereto.

DESCRIPTION OF THE SPECIFIC EMBODIMENTS

Figure 1:
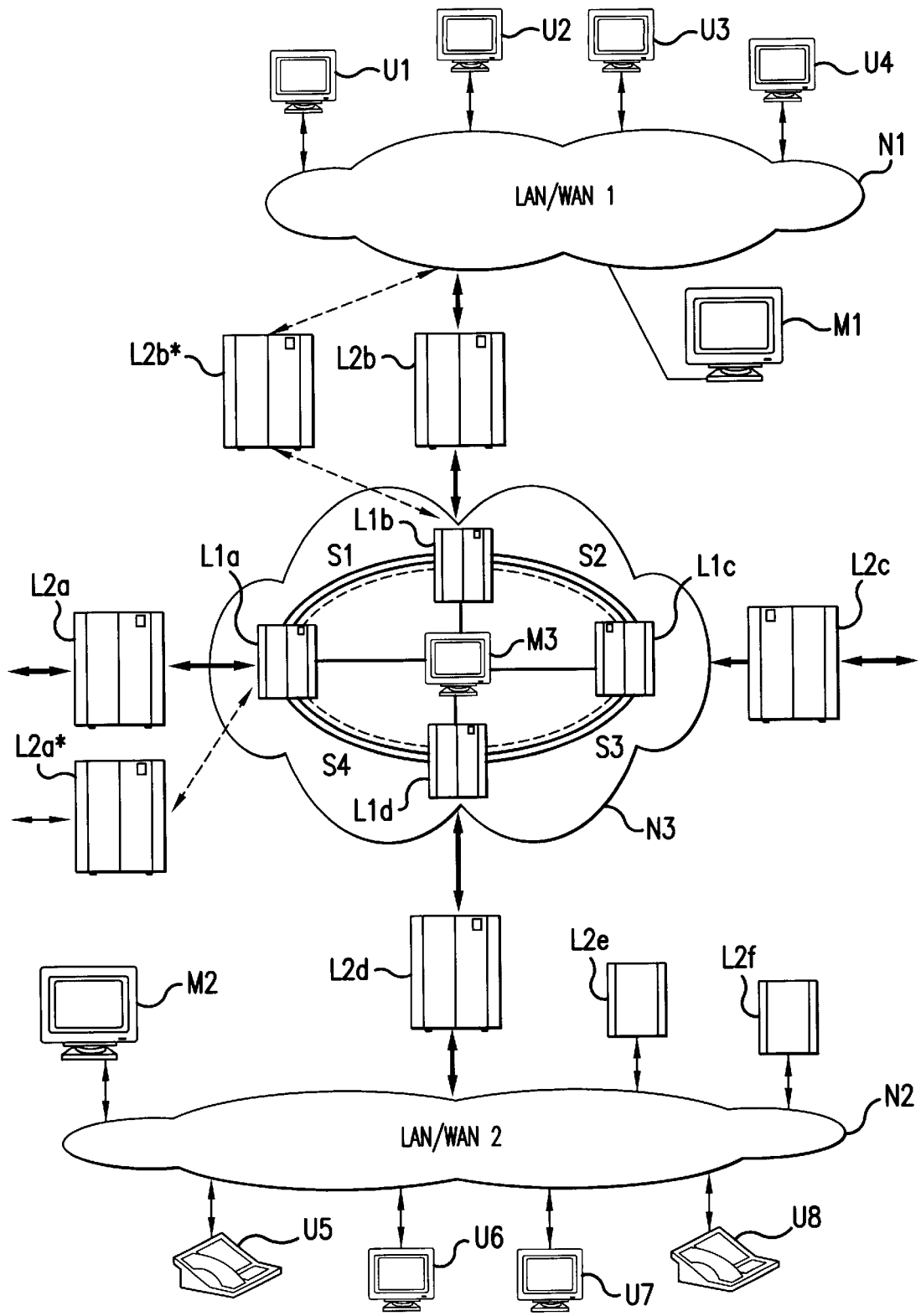
FIG. 1 is a block diagram illustrating exemplary network systems in which the present invention may be employed including spare layer 2 (L2) NEs.

FIG. 1 shows an illustrative example of a simple networking structure. The general diagram of FIG. 1 can represent many different specific network configurations in which the present invention may be employed. Before proceeding further the following abbreviations and/or acronyms are used in this specification: layer 1 (L1), layer 2 (L2), Layer 3 (L3), networks (N), network 1 (N1), network 2 (N2), network 3 (N3), end systems 1–4 (U1-4), management station 1 (M1), management station 2 (M2). In the figures there are more than one layer 2 NE and more than one layer 1 NE. Thus, to distinguish these NEs letters are appended. For example, L2a and L2b designate a first and second layer 2 NE. An asterisk(*) is used to designate a backup or spare NE. For example, L2a* is a backup layer 2 NE for L2a.

In a more specific interpretation of FIG. 1, N1 and N2 are local user networks and N3 is an internetwork or a subnetwork for providing communication between local user networks. L2 NEs would therein represent routers or other NEs for connecting local networks to a wider network.

In either interpretation, each of the network clouds labeled N1 and N2 could be understood as configurations of ethernet equipment, fiber optic equipment, radio frequency mesh network equipment, LAN ATM equipment, or combinations of technologies now existing or later developed to provide network communication.

Figure 2A:
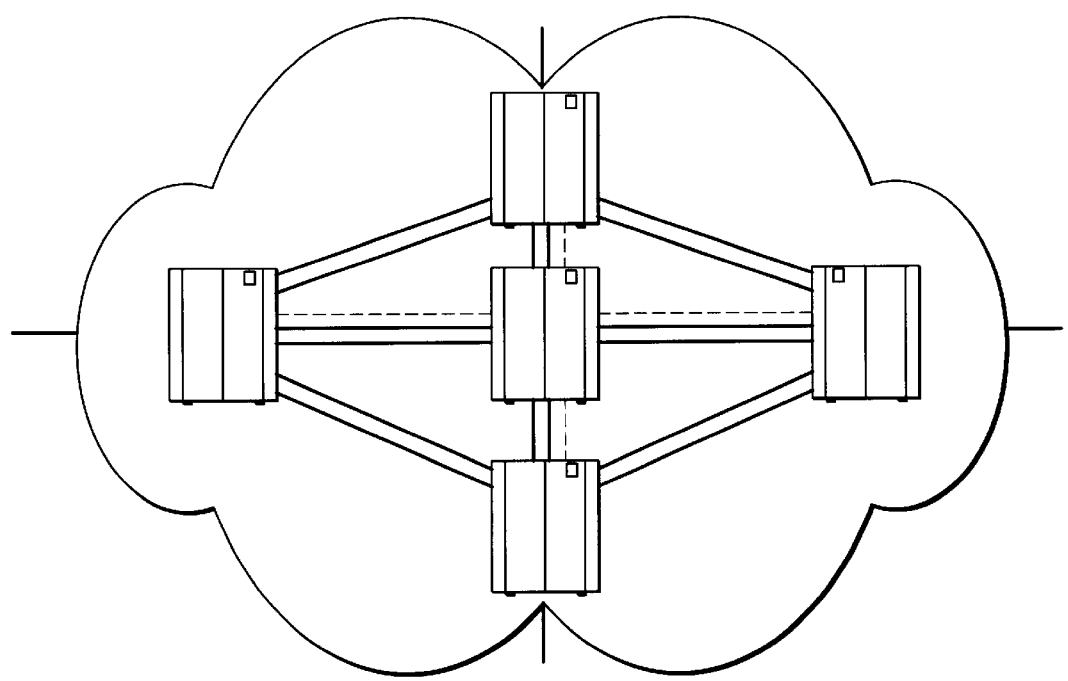
FIG. 2A is a block diagram of a first alternative arrangement of subnetwork NEs.
Figure 2B:
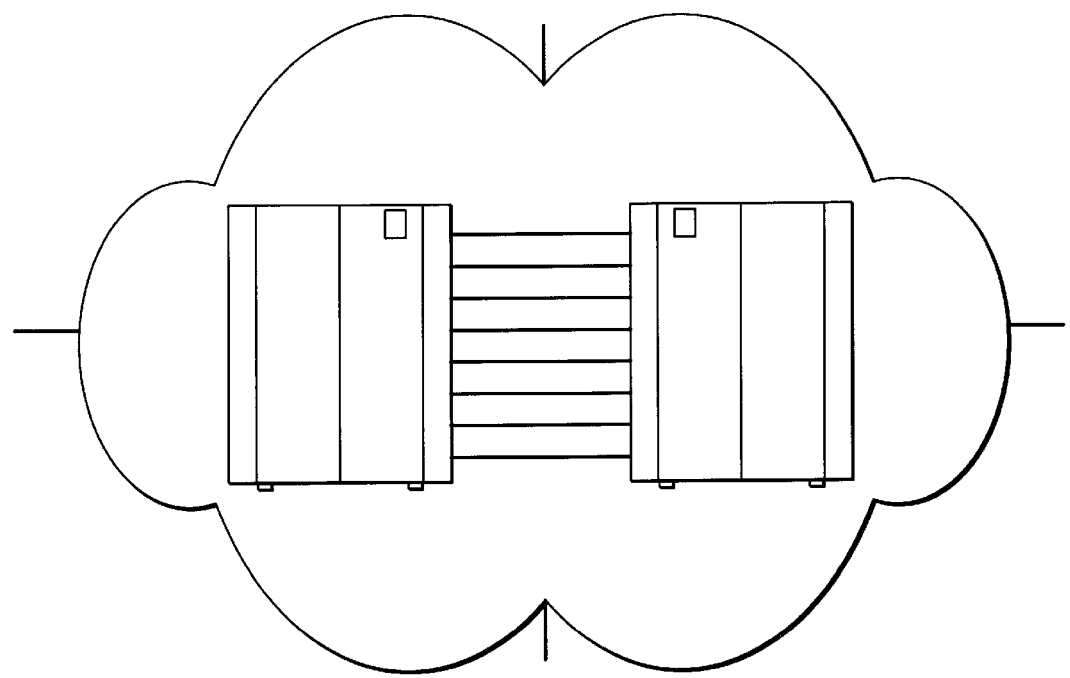
FIG. 2B is a block diagram of a second alternative arrangement of subnetwork NEs.

In a further specific interpretation, N3 represents a subnetwork and the L1 NEs are subnetwork NEs. Commonly used subnetwork technologies include ATM (represented in FIG. 2B), TDM, optical transmission technologies such as SONET. One known optical configuration is represented by the ring configuration shown in FIG. 1 and another known configuration is represented by the mesh configuration shown in FIG. 2A.

In a layered network configuration, it is typical that NEs at a particular layer operate as though they were in direct connections with other NEs at their layer. An L2 NE generally will know out of which out port it should transmit a packet for a specific other L2 NE, and may know some performance characteristics of the a particular channel. An L2 NE generally will not know whether a channel is a direct wire, radio connection, or is provided by some other network. In prior art networks, an L2 NE generally will not communicate directly with any of the NEs in the other network providing the communication channels.

It is further known in the art that L1 NEs, while their operation may be transparent to L2 NE, do generally have an L2 layer network address. This address is not generally used by the L2 NEs, but it may be used by a remote management station to communicate over the network with an L1 NE.

FIG. 1 also shows spare NEs L2b* and L2a*. These spare NEs may represent spare or backup physical devices that can be used in place of their corresponding devices, or these spare NEs can represent alternate data, paths that can handle the traffic that would otherwise be carried by the primary NEs. While in the figure, backup L2 NEs L2b* and L2a* are shown as being connected to the same L1 NEs as the primary L2 NEs, it should be understood that in practice, the backup L2 NEs may be connected to different L1 NEs for greater redundancy. For instance L2b* may be connected to L1c. L2 NEs which are database query servers could thereby be backed up by equipment at a different site.

Agents and SNMP

In many networks in use today, some or all of the NEs include agents that monitor and can affect various states of those NEs. These agents communicate with external entities allowing for remote monitoring and management of the NEs with which the agent is associated. Agents are not explicitly shown in the FIG. 1, but they can be understood as logical processes running on some or all of the NEs shown.

One important type of known external entity that communicates with agents is referred to as a management station (MS), such as MS1–3 illustrated as examples in FIG. 1. NE agents communicate internal states of their NE to the MS, generally either in response to queries from the MS or as a result of alarms. An MS station allows a human user (or intelligent management software) to receive information from the agents and then send commands to the NEs. An MS may send commands back to the NE agents that direct the agents to modify certain operation of their NEs or to establish alarms. Known network management stations include SunNet Manager and HP OpenView.

Communication between NE agents and one or more MSs is often performed through a predefined standardized protocol. One well-known protocol for management and monitoring is Simple Network Management Protocol (SNMP), initially defined through the Internet Engineering Task Force. Another management protocol is CMIP, defined by ISO OSI. SNMP has been modified and extended over the years by individual NE vendors and the IETF to incorporate additional functions. According to an early IETF document (RFC 1157), SNMP is described as follows:

"The SNMP Architecture implicit in the SNMP architectural model is a collection of network management stations and NEs. Network management stations execute management applications which monitor and control NEs. NEs are devices such as hosts, gateways, terminal servers, and the like, which have management agents responsible for performing the network management functions requested by the network management stations. The Simple Network Management Protocol (SNMP) is used to communicate management information between the network management stations and the agents in the NEs."

Many vendors of network and computer equipment have developed devices and software that uses SNMP. SNMP defines a get/set protocol for communicating information between NEs and a management station. Sets and gets are transmitted by an MS to an NE. Sets or gets specify variables, referred to as MIBs, which generally relate to some aspect of an NEs operation such as its address, port table, port priorities, errors encountered, etc. MIB variables can be single values or hierarchical arrays of values. Performing a get on a MIB generates a response from the NE that tells the MS something about the NE's operation. A set, where allowed and authorized, can cause a modification in an NE's operation.

SNMP includes some standard MIB definition, but individual vendors can extend SNMP by defining proprietary MIBs. Given the diversity of NE and management station vendors, network management stations are routinely deployed in networks where some of the NEs are built by other vendors. Therefore, many different vendors often must closely coordinate the operational design of their systems in order to have a common set of MIB definitions a difficult task that can result in delays in bringing new features or products to market.

Correcting Communication Channel Problems

An underlying assumption in many network systems represented by FIG. 1 is that the different groups (or in a specific embodiment, layers) of NEs are responsible within a group for ensuring communications are working properly. A failure in the interconnection somewhere between L1 NEs, for example, is expected to be detected and corrected within that group.

Patent application Ser. No. 09/020,954, describes an NE in which it is desirable for the NE not to examine data signals connected through it. In one embodiment, the present invention allows such an NE to determine if data signals flowing through its are working properly without examining those signals. The NE can then take corrective action, either by configuring itself or by causing other NEs to alter their operation.

According to the invention, an NE such as L1a is enabled to send queries to another NE, such as L2a, to determine operating parameters of that other NE. In an advantageous embodiment, these queries are expressed in a preexisting standard management protocol and are made to a standard agent associated with L2a. From the point of view of L2a, the queries are identical to queries coming from a management station and custom protocol definitions within L2a are not required. Queries between L1a and L2a may be transmitted over a local network connection between the two devices or may be routed through a larger network such as done for other data.

In a particular embodiment, the invention uses SNMP and L1a includes an SNMP query engine (which may include just a subset of SNMP MIB definitions). L1a performs SNMP sets and gets to L2a–e or to any other NE with an SNMP agent for which L1a knows the address. L1a can also receive standard format SNMP alarms. L1a includes logic to determine from responses received from other NEs if a performance problem in L1a channels exists. Thereafter, L1a may reconfigure itself and cause reconfiguration of other NEs. The present invention therefore allows a group of NEs to coordinate its operation with another group of NEs using an existing network management protocol. (As used herein and in the claims, the term group should be understood to also encompass a group of one unless the context requires otherwise.) It will be seen that management stations such as M1–3 are not required for operation of the invention, though in one embodiment a management station could be used to respond to some queries or to filter or forward data between L2 agents and the L1 NEs.

As a specific example of the operation of the invention using SNMP definitions, consider the NE L1a, enabled to poll the Interfaces Group MIB in L2a–f. L1a can thereby get standard SNMP fields ifInErrors (which reports the total number of input errors for a particular interface group) and ifInOctets (which reports the total number of input octets received for a particular interface group) for a connection it is concerned about. L1a can compare these values to determine the line error rate, which can then be used to infer the performance of the channel. L1a can then take corrective configuration action if necessary.

L1 and L2 NEs in the preceding discussion are assumed to be in different network groups that are not generally participating in a common routing or bridging protocol. However, it should be understood that an NE generating the set and get requests could be at either a higher layer, a lower layer, or an equal layer to an NE responding to the requests.

It should also be understood that requests may be generated by a separate device such as a management station, working cooperatively with an NE; that separate device could then make inferences and take configuration action. Again, however, an MS according to this embodiment of the invention, performs sets and gets on an NE in order to infer the performance and coordinate behavior with a different NE.

In either case, according to various embodiments of the invention, the NEs (or an associated device) that are generating requests are modified to include the capabilities to form the queries, make inference from responses to the queries, and take some configuration action. Responding NEs need only have standard management agent response capabilities.

Determining Performance of an Optical Channel

In one embodiment of the invention, L1a is an optical transport NE with wave-division multiplexing (WDM) such as described in Ser. No. 09/020,954. L1a in this example provides an optical communications channel from L2a to L2c over a particular optical wavelength. According to the invention, L1a is able to infer performance for an optical channel without direct measurement of the optical signal and to take corrective if needed. Corrective action could include rerouting the signal on an alternate optical path. Thus, according to an embodiment of the invention, L1 NEs can use standard MIB definitions and SNMP protocol to determine when to take a proprietary corrective such as routing to an alternate path. In accordance with SNMP, an NE such as L2a or L2b can also be configured for alarms to be sent to L1 devices. Alarms may be set by L1 device, by another entity, or be preset.

In another embodiment, a central management station associated with one or more subnetwork NEs, such as M3, is responsible for collecting operating information from other layer NEs. M3 can then configure the operation of multiple subnetwork NEs in response to information learned from the other network.

Table 1, shown below, is an example of a database according to an exemplary specific embodiment of the invention. This database is kept by L1 NEs, either at an L1 NE or at an L1 management station. Referring back to FIG. 1, in one configuration, the L1 network may establish a connection (C1 in Table 1) between NEs L2a and L2b via span S1 and another connection (C2 in Table 1) between L2b and L2d via spans S2 and S3 with intermediate NE L1c. In an embodiment where the L1 NEs are optical NEs using wave division multiplexing, each connection will further specify one or more wavelengths, $\lambda$.

The database allows L1 NEs to examine the path for a connection, and determine which L2 NEs to query in order to infer performance of the optical path. In a specific embodiment, as shown, the database contains L1 box/port and path information along with the L2 NE's IP address, L1 port ID, L2 NE MIB objects to monitor, and alarms for the L1 NEs to request from the L2 NEs.

According to this embodiment of the invention, the L1 NEs are provided with a data connection to the other devices for which they provide a communication channel, either a direct channel, or via data forwarding between the L2 NEs, or via data forwarding within the collection of L1 NEs.

TABLE 1

| Con Id | 1st End | MIB objects | Path | 2nd End | MIB objects |
|---|---|---|---|---|---|
| | | Address/Object/MIB_Group/ (MIB_variable, . . . ) | \|inPort/NE/outPort\|λ, \|inPort/NE/outPort\| . . . | | Address/Object/MIB_Group/ MIB_variable, . . .) |
| C1 | L2b | L2b_IP/L2b_Port_λ1/ InterfacesGroup(ifInErrors, ifInOctets) | \|Local1/L1b/S1\|λ1 \|S1/L1a/Local1\| | L2a | L2a_IP/L2a_Port/ InterfacesGroup(ifInErrors, ifInOctets) |
| C2 | L2b | L2b_IP/L2b_Port_λ2/ InterfacesGroup(ifInErrors, ifInOctets) | \|Local1/L1b/S1\|λ2 \|S1/L1c/S2\|λ2 \|S2/L1d/Local1\| | L2d | L2d_IP/L2d_Port_ID_S1/ InterfacesGroup (ifInErrors, ifInOctets) |

In response to an error detected on a particular connection, such as C2, the L1 devices may select an alternate path for some or all of the optical spans that make up connection C2 to create a restoration. One means for providing alternate optical paths is discussed in Ser. No. 09/020,954, incorporated by reference above. This embodiment may be illustrated by FIG. 1 if N3 is interpreted as a subnetwork, the two solid lines between L1 NEs are interpreted as working optical channels, and the dashed lines are interpreted as protection channels. Likewise, FIG. 2A can be interpreted as an optical mesh network, with only some spans including protection channels.

Figure 3:
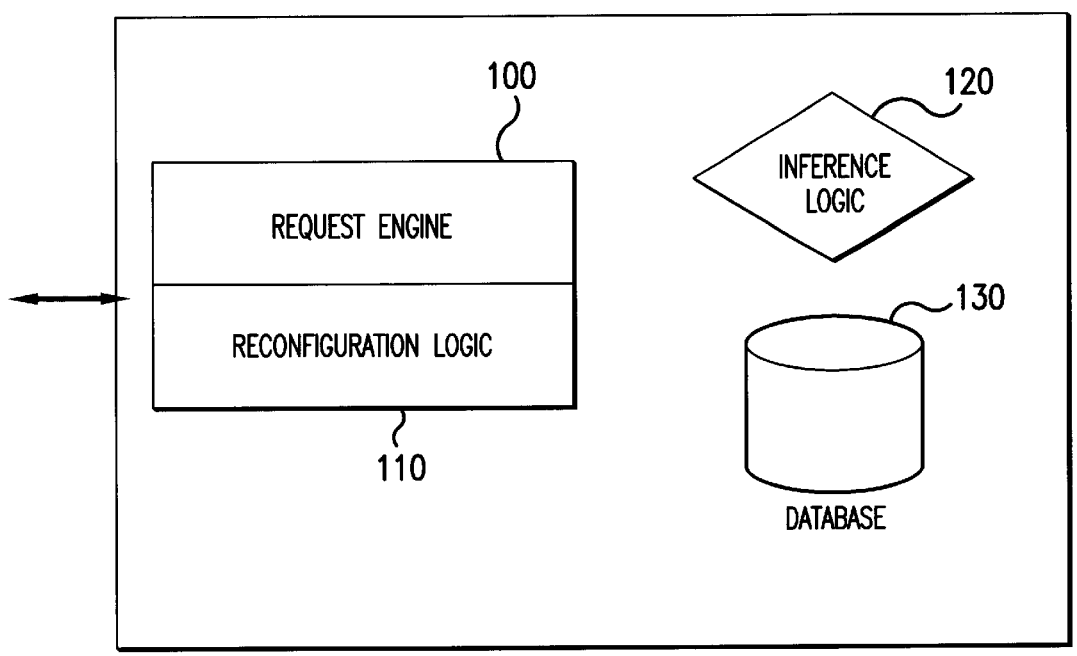
FIG. 3 is a simple block diagram of a device including components according to an embodiment of the invention.

FIG. 3 is a block diagram representing an NE (or MS as described above) with additional components according to the invention to allow it to make requests to other NEs and to take configuration actions based on those requests. Show in the figure is a request engine, 100, reconfiguration logic 110, inference logic 120, and database 130. According to an embodiment of the invention, these elements are incorporated into an NE (or associated device) as elsewhere herein described.

As another example of corrective action, an L1 device may use a set to adjust the port priority or path cost recorded in an L2 NE (by using, for example, known MIBs dot1dBridge/dot1dStp/PortTable) to reflect the topology costs at the L1 layer with the intent of modifying the behavior of the routing or bridging algorithm (such as spanning tree) at the L2 layer.

A further advantage in the coordination between L1 NEs and the L2 NEs provided by the invention is that the invention allows L1 subnetwork to provide alternate redundant paths more efficiently by knowing the L2 status. By having information about the error rates seen by the L2 NEs, the L1 layer can proactively prepare backup paths for L2—L2 connections. Further, by discovering that particular L2 NEs are disabled, the L1 layer can reallocate primary or secondary capacity dedicated to those L2 NEs, to backup other L2—L2 connections. These advantages can be realized according to the invention by the L1 implementation group without need for a customized protocol between L1 NEs and L2 NEs or, in one embodiment, without modification to L2 NEs.

Further Applications of the Invention

A further example application for the invention is in the field of uninterruptible power supply (UPS) used to provide short term back up power to an NE in case of a power failure. A UPS generally has a connection (such as an RS232 serial cable) connected to a computer associated with the NE that informs the NE that power has been lost and the UPS is running on batteries. The computer can therefore begin to shut down, if necessary, in a controlled fashion and can alert the NE that power is going down.

According to one embodiment of the invention, a UPS may be provided with an SNMP query engine and a network connection and can use that connection to signal its immediate NE that it is going to lose power and can signal other NEs (either at its own layer or at different layers) that an NE is losing power and the other NEs can then reconfigure in response to loss of that NE.

A further example application for the invention is a situation where a determination is made at one layer that a particular link is disabled. For example, IEEE 802.1D bridges employ a spanning tree algorithm that can dynamically determine that some links between bridges should be disabled and will mark those links disabled. In prior art networks, the information that a bridge-layer link has been marked disabled may not become known to a subnetwork layer for some time, or at all. The subnetwork may then continue to reserve capacity for the link, which in fact will not receive any traffic. A query engine in a subnetwork device modified according to an embodiment of the invention could learn directly from a standard layer 2 NE that the link is marked disabled and could reallocate subnetwork resources. Alternatively, as discussed above, the bridge could be modified according to the invention and could inform a standard subnetwork device that the link has been marked disabled.

Redirection of Traffic To a Backup Channel

Another application for the invention, as discussed above, is in providing a mechanism where traffic can be redirected to a backup other-group NE terminal when the primary NE either fails, develops predefined performance problems, or has some other predefined operating status such as excessive congestion. The steps taken by a group of network devices, such as L1 devices shown in FIG. 1, according to an embodiment of the invention are described below.

For the situation where NE L2a is connected to NE L2b by L1 NEs and NE L2a is backed up by NE L2a*, which can provide an alternative path for traffic through L2a, if L2a fails, NE L2b should be connected to NE L2a*. An L1 NE, according to a further embodiment of the invention and as shown in FIG. 4, will perform as follows:

a—poll (10) L2a for status;
    b—Decide (20) if L2a non responsive, query (40) L2b for L2b's view of the connection. If L2a is responsive then the problem has obviously been resolved and no alternative path is needed (30). If L2a is not responsive then another decision (50) is made based on the query (40) to L2b.;
    c—if L2b shows the connection is down, redirect (60) the channel to L2a*;
    c1—if L2b shows the connection is OK, assume (70) the out-of-band connection between L1 and L2a is not functioning;
    c2—if L2b is non responsive, do not (80) redirect or reconfigure the channel and wait (90) for contact to be re-established with either L2a or L2b.

For the situation where NE L2a is connected to NE L2b by L1 NEs and NE L2a is backed up by NE L2a* and NE L2b is backed up by NE L2b*, if L2a fails, NE L2b or L2b* should be connected to NE L2a* and if L2b fails, NE L2a or L2a* should be connected to NE L2b*. An L1 NE, according to a further embodiment of the invention, will perform as follows:

a—poll L2a (or L2b) for status;

b—if L2a (or L2b) non responsive, check L2b (or L2a) for its view of the connection;

c—if L2b (or L2a) shows the connection down, redirect the channel to L2a* (or L2b*);

c1—if L2b (or L2a) shows the connection OK, assume our connection to L2a (or L2b) is broken;

c2—if L2b (or L2a) non responsive, provide a channel between L2a* and L2b* and once the channel is established, and L2a/L2b still not in contacted, drop the L2a/L2b connection.

As discussed previously, while FIG. 1 and the previous example are illustrated assuming backup L2 NEs L2b* and L2a* are connected to the same L1 NEs as the primary L2 NEs, it should be understood that in an alternative deployment according to the invention, the backup L2 NEs may be connected to different L1 NEs for greater redundancy. For instance L2b* may be connected to L1c. L2 NEs which are database query servers could thereby be backed up by equipment at a different site.

Plug And Play Consistency Checking

In a further embodiment, the invention can also perform plug and play consistency checking as an alternative to a low frequency modulation of the channel provided in prior art systems. To perform this checking, the a NE uses the methods described above to operate as follows:

As part of provisioning and installation, disable the optical port before plugging it in.

a—provision the optical channel b—check that ports are disabled c—enable the optical ports at the two ends d—monitor signal at the appropriate transponders if possible d1—and/or query signal status at both ends e—cycle port enables with some pattern, through steps c, d f—infer whether the ports are correctly plugged in Transmission of Query and Response Packets to Remote NEs In typical installations, L1 Optical Transport Layer Equipment (OTLE) can communicate with L2 equipment at the same site via a local connection (such as a LAN) at the site. This LAN is generally a separate network from the optical data channel that generally carries more-distant, WAN traffic. To communicate with remote, L2 equipment, an L1 NE according to the invention must find a path to the remote L2 device. Because the set of L1 equipment forms a network, the local L1 device can communicate with a remote L1 device and have that remote L1 device forward the network management request to the remote L2 device. An internal request may be launched by the local L1 device over the L1 subnetwork addressed to the remote L1 device, forwarded by a routing algorithm used by the L1 subnetwork. The remote L1 device can then form a standard management request using the format and addressing of the LAN used at the remote L2 location and forward that request to the remote L2 device.

The local L1 device can also launch query packets to the remote L2 device through its local LAN to the local L2 device. These packets may be launched instead of packets sent through the L1 connections or in addition to those packets. In this case, the packets can then take advantage of any path diversity built into the L2 network. In some instances the local L2 device will reformat the packet for WAN communications and place the packet back onto the L1 provided data channel for transmission. In other cases, a different available path may be used at the L2 level.

In transmitting such packets, the invention may use any framing protocol available on the network that it is transmitting for encapsulation or transmission. Such available protocols include the known IP protocol, the variant of the IP protocol Open Shortest Path First (OSPF), a version of which is described in RFC 2328, or other protocols. Available protocols also include spanning tree bridge protocols.

The invention has now been described with reference to specific embodiments. Other embodiments will be apparent to those of skill in the art. The invention should therefore not be limited in scope except as provided in the attached claims.

What is claimed is:

1. A method for use in communication systems having at least a first network layer group of first network layer elements and a second network layer group of second network layer elements comprising:

at a first network layer element, sending a query in a network management protocol to a first element in said second network layer group requesting status of that element, the first network layer group and the second network layer group being part of a hierarchical arrangement of network layers for handling traffic data, wherein the first network layer group provides different networking functions for handling the traffic data than the second layer group;

wherein, the query is generated by a request engine in said first network layer element, said request engine generating queries to the first element in said second network layer group a response to which by the first element in said second network layer group is used by the first network layer element to infer operation of said first network layer element, and for receiving responses from the first element in said second network layer group, the responses including connection and operation information;

at the first network layer element, receiving a response from a management agent of the first element in said second network layer group indicating whether an element in said second layer group has a predefined operating status; and at the first network layer element, upon receiving the response including the operating information from the first element in the second layer group that an element in said second layer group has a predefined operating status indicating that rerouting is desirable, rerouting data traffic to a backup second network layer element according to the connection information wherein queries and responses are transmitted using an SNMP network management protocol.

2. The method according to claim 1 wherein said queries are transmitted using get and set operators performed on variables indicating operating parameters.

3. The method according to claim 1 wherein said first network layer is part of a sublayer providing sublayer transport services to said second network layer.

4. The method according to claim 1 wherein said first network layer is part of an optical communication layer.

5. The method according to claim 1 wherein said first layer comprises higher network layer elements than said second layer.

6. The method according to claim 1 wherein said second network layer comprises higher network layer elements than said first network layer.

7. The method according to claim 1 wherein said query is first sent to a second element in said first network layer group and wherein said second element in said first network layer group is more directly connected to said first element in said second network layer group.

8. The method according to claim 7 wherein said query is sent in a first protocol used by said first network layer and wherein said query is formed by said second element in said first network layer group into the management protocol used by said second network layer.

9. The method according to claim 7 wherein queries and responses are transmitted using an SNMP network management protocol.

10. The method according to claim 7 wherein transmission via elements in the first layer group is by encapsulation in IP packets and is directed by IP routing protocols.

11. The method according to claim 7 wherein transmission via elements in the first network layer group is by an open shortest path first routing protocol.

12. The method according to claim 7 wherein transmission via elements in the first network layer group is directed by bridge forwarding over a spanning tree.

13. The method according to claim 1 wherein said first network layer element transmits to a remote second network layer element by sending on its local link connected to local second network layer elements packets in the network management protocol used by the second network layer elements and utilizing the forwarding function of the second network layer to forward the packets to the remote second network layer element.

14. The method according to claim 1 further comprising:
at the first network layer element, if a response is not received to a first query to the first element in said second network layer, sending a second query to a second element in said second network layer group requesting status of the connection with said first network layer element;
at the first network layer element, rerouting data traffic from the first element in said second network layer group to a backup element in said second network layer group only upon receiving a response from the second element in said second network layer group that a connection with said first element is experiencing performance problems.

15. The method of claim 1 further comprising:
storing information regarding the identity of the second network layer element and the responses received by the request engine.

16. The method of claim 1 wherein the first network layer is a physical layer and the second network layer is a data link layer.

17. A method for operating an optical communications network element having configurable channels comprising:

receiving a light signal on an input port from an input channel at an element in a first network layer;
coupling a portion of said light signal up to all of said light signal to an output channel via a configurable circuit;
receiving, from a management agent at an element operating in a second network layer, said agent designed for communication with a management station, a response to a query in a network management protocol indicating that an element operating in the second network layer has a predefined operating status, the first network layer and the second network layer being part of a hierarchical arrangement of network layers, wherein the first network layer provides different networking functions than the second network layer; and
in response thereto, routing data to a backup element in said second network layer wherein said response and said query are transmitted using an SNMP network management protocol and said agent is an SNMP agent.

18. An optical network for providing network data communications among a plurality of served nodes, said optical network comprising:
at least one optical element;
a plurality of optical channels, said optical element and optical channels configurable to provide a plurality of optical connections;
said optical element including a database that stores information regarding the identity of served nodes for a connection and the identity and routing path for backup nodes for said served nodes;
said optical element including a request engine that generates queries in a network management protocol to management agents at said served nodes, said queries regarding operational status of a served node or of a connection seen by a served node and for receiving responses from said served nodes, said optical element is in a first network layer and said served node is in a second network layer, the first and second network layers being part of a hierarchical arrangement of network layers, wherein the first network layer provides different networking functions than the second network layer;
said optical network element including an inference engine that determines, from said responses, whether a served node has developed a predefined operating status; and
said optical element including reconfiguration circuits that can route traffic directed to a node with said predefined operating status to an alternative path wherein said requests are transmitted using an SNMP network management protocol and said management agents are SNMP agents.

19. A network according to claim 18 wherein said operating parameters are transmitted using get and set operators performed on variables indicating operating parameters.

* * * * *